United States Patent Office 3,026,270
Patented Mar. 20, 1962

3,026,270
CROSS-LINKING OF POLYMERIC EPOXIDES
Anderson E. Robinson, Jr., Newark, Del., assignor to Hercules Powder Company, Wilmington, Del., a corporation of Delaware
No Drawing. Filed May 29, 1958, Ser. No. 738,629
20 Claims. (Cl. 260—2)

This invention relates to unique special purpose rubbers and more particularly to the vulcanizates produced by cross-linking poly(epihalohydrin)s.

For many rubber applications specialty rubbers are required and no one rubber has previously been known that had the requisite physical properties that it could be substituted for these many specialty rubbers. For example, if it had solvent resistance, it lacked high or low temperature resistance, etc.

Now, in accordance with this invention, it has been found that high molecular weight polymers and copolymers of epihalohydrins may be vulcanized, i.e. cross-linked, with polyamines to produce a rubber that has the good attributes of a number of the so-called specialty rubbers and hence, may be used as what might be termed, a general purpose specialty rubber. They have excellent resistance to all classes of solvents, polar and nonpolar, aliphatic and aromatic, excellent aging characteristics, excellent high and low temperature performance and excellent general elastomeric quality. Hence, these new rubbers may be used in place of the several different specialty rubbers now on the market.

Any high molecular weight polymer, homopolymer or copolymer, of an epihalohydrin, as for example, epichlorohydrin or epibromohydrin, homopolymers or copolymers with one or more other epoxides may be cross-linked with a polyamine to produce the valuable new vulcanizates of this invention. These polymers are readily prepared by polymerization of epihalohydrins with, for example, organoaluminum compounds as catalysts. Particularly effective catalysts for the polymerization of epihalohydrins are alkylaluminum compounds that have been reacted with from about 0.2 to about 1 mole of water per mole of alkylaluminum compound. The polymer obtained by means of these catalysts may be essentially wholly amorphous or crystalline or it may be a mixture of the amorphous and crystalline polymers. Generally, the amorphous polymers are preferred since the crystalline polymers on vulcanization tend to be hard, brittle and lacking in elasticity. These properties are, of course, useful in the case of molded articles which may be prepared by molding the compounded polymer and then curing to cross-link and set it. However, excellent rubber-like materials are obtained by vulcanizing mixtures of amorphous and crystalline polymers. In this case, the amount of the crystalline polymer is generally less than about 25 to 30% of the mixture. When epihalohydrins are polymerized by this process, polymerization takes place, at least in major part, through the epoxide linkage so that the product is a polyether containing halomethyl groups attached to the main polymer chain. They are believed to have the following general formula

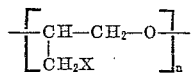

where X is halogen. In the same way, when an epihalohydrin is copolymerized with one or more other epoxides, polymerization takes place through the epoxide linkage even though ethylenic unsaturation or other polymerizable groups may be present. Typical of epoxides that may be copolymerized with an epihalohydrin to produce a copolymer that may be cross-linked in accordance with this invention are the alkylene epoxides such as ethylene oxide, propylene oxide, butene oxides, etc., butadiene monoxide, cyclohexene oxide, vinyl cyclohexene oxide, epoxy ethers such as ethyl glycidyl ether, 2-chloroethyl glycidyl ether, hexyl glycidyl ether, allyl glycidyl ether, etc.

As pointed out above, the poly(epihalohydrin)s that are vulcanized or cross-linked in accordance with this invention are high molecular weight polymers. Any homopolymer or copolymer that has a reduced specific viscosity of at least about 0.2, as measured on an 0.1% solution in α-chloronaphthalene at 100° C., may be cross-linked with a polyamine to yield a polymer of increased tensile strength and modulus. The term "Reduced Specific Viscosity" (RSV), which is a function of molecular weight is used herein to designate the specific viscosity measured at 100° C. on an α-chloronaphthalene solution of the polymer, containing 0.1 gram per 100 ml. of solution, corrected to zero shear gradient, divided by the concentration of the solution. Polymers having an RSV of from about 0.2 to about 0.5 may be cross-linked as described herein to yield vulcanizates of increased tensile strength and modulus and while these vulcanizates are generally not useful as specialty rubbers, they are useful as potting compounds. However, polymers having an RSV of about 0.5 and above on cross-linking yield excellent rubbery polymers that, as pointed out above, they may be used as general purpose specialty rubbers.

These poly(epihalohydrin)s and epihalohydrin copolymers are cross-linked by heating a mixture of the polymer and a polyamine to an elevated temperature for a short time. Any amine containing two or more amino groups may be used as the cross-linking agent in accordance with this invention. The amino groups may be primary, secondary or tertiary amino groups. Exemplary of such polyamines are hydrazine, aliphatic amines such as ethylenediamine, propylenediamine, tetramethylenediamine, hexamethylenediamine, etc., up to alkylenediamines of 20 carbon atoms or more, diethylenetriamine, etc., cycloaliphatic amines such as melamine, piperazine, pyrazine (paradiazine), etc., aromatic amines such as p-phenylenediamine, naphthalenediamine, biphenyldiamine, etc. and polymeric amines such as poly(2-methyl-5-vinylpyridine), etc. Instead of the free amine, a salt of the amine may be used as, for example, the hydrogen halides, in which case an alkaline material such as calcium or barium oxide is also added. Internal salts of the amines may also be used, as for example, hexamethylenediamine carbamate, which type of salt decomposes to the free amine at or below the curing temperature.

The polyamine may be incorporated or admixed with the polymer in any desired fashion. For example, the amine and polymer may be uniformly blended by simple milling on a conventional rubber mill. By this means the amine is uniformly distributed throughout the polymer and uniform cross-linking is effected when the blend is subjected to heat. When the amine is blended with the polymer, cold roll milling procedures may be used, as for example, with the rolls cooled to about 50° F. or the milling may be done at room temperature or above, in the latter case with one roll preferably slightly warmer than the other. Other methods of admixing the amine with the polymer will be apparent to those skilled in the art. Any amount of the polyamine may be added and will depend chiefly upon the degree of cross-linking desired. Generally, from about 0.5% to about 10% and preferably from about 1% to about 5% of the amine based on the weight of the polymer will be added.

The temperature at which the cross-linking is effected may be varied over a wide range. It may be effected in minutes at temperatures around 300° F. or in days at room temperature. To some extent, it depends upon the type of amine being used as the cross-linking agent. For example, with a compound such as hexamethylenediamine carbamate, an inner salt which is stable at processing temperatures up to 175° F., but which releases its free amine at higher temperatures, requires the higher vulcanization temperatures. In general, the cross-linking temperature will be within the range of from about 250° F. to about 340° F. and preferably from about 280° F. to about 310° F. and will vary inversely with the temperature of from about 5 to about 60 minutes and preferably from about 15 minutes to about 30 minutes.

In addition to the amine, other ingredients may also be incorporated. The additives commonly used in rubber vulcanization may be used here also as, for example, extenders, fillers, pigments, plasticizers, etc. The presence of a filler, and in particular carbon black, is beneficial and, as in rubber compounding gives optimum results. Obviously, there are many cases in which a filler is not required or desired and excellent results are achieved when only the amine is added.

The following examples will illustrate the process of cross-linking epihalohydrin polymers in accordance with this invention and the superior vulcanizates so obtained. All parts and percentages are by weight.

EXAMPLES 1–14

These examples demonstrate the use of various polyamines for cross-linking poly(epichlorohydrin).

*Preparation of Poly(epichlorohydrin)*

A polymerization vessel with a nitrogen atmosphere was charged with diethyl ether and 10 parts of epichlorohydrin. After equilibrating at 30° C., a solution of the catalyst was injected. The catalyst solution was prepared by diluting a molar solution of triisobutylaluminum in n-heptane to 0.5 molar with ether, adding an amount of water equivalent to 0.5 mole of water per mole of aluminum and agitating the solution for 20 hours at 30° C. An amount of this catalyst solution equivalent to 0.79 part of triisobutylaluminum was used in the polymerization. The total diluent present amounted to 17.5 parts and contained 84% ether and 16% n-heptane. After 19 hours at 30° C., the polymerization was stopped by adding 4 parts of anhydrous ethanol. The mixture was then diluted with 40 parts of ether, after which the ether-insoluble polymer was collected and washed twice with ether. It was purified by slurrying the insoluble polymer with a 1% solution of hydrogen chloride in ethanol. It was again collected, washed with methanol until neutral, then with an 0.4% solution of Santonox, i.e., 4,4'-thiobis-(6-tert-butyl-m-cresol), in methanol and finally was dried. The poly(epichlorohydrin) so prepared had an RSV of 1.2. It was largely amorphous, containing less than about 10% crystalline polymer.

By the term RSV is meant "Reduced Specific Viscosity" which is the $\eta_{sp}/C$ determined on a 0.1% solution of the polymer in α-chloronaphthalene at 100° C.

*Preparation of Vulcanizate and Properties*

Polymer compositions were made up by mixing on a two-roll mill (rolls cooled to about 50° F.) 100 parts of the polymer and the specified polyamine and any other additives as shown in Table I for each example for about 5 minutes. The stocks were then cross-linked by heating at 300° F. for 40 minutes. The extent of cross-linking was determined by analysis for percent gain in insolubility in solvents in which uncross-linked polymer is soluble. This is termed percent gel hereinafter. Data are tabulated in Table I in comparison with a blank formulation in which the polyamine was omitted.

The percent gel and percent swell are determined as follows: a weighted sample of polymer weighing about 100 mg. is soaked in an excess of toluene (30 cc.) in a closed container for 48 hours. The sample is then removed, blotted on filter paper without squeezing so as to remove toluene on the surface and weighed at once. The swollen sample is then dried in a current of air at room temperature over a 72-hour period to constant weight. The weights of initial and final sample are corrected for nonpolymer content based on knowledge of components. From these figures:

$$\frac{\text{Corrected dry weight}}{\text{Corrected initial weight}} \times 100 = \text{percent gel}$$

Similarly percent swell is calculated by the formula:

$$\frac{\text{Swollen weight-corrected dry weight}}{\text{Corrected dry weight}} \times 100 = \text{percent swell}$$

TABLE I

| Example | Blank | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Composition (parts): | | | | | | | | | | | | | | | |
| Polymer | 100 | 100 | 100 | 100 | 100 | 100 | 100 | 100 | 100 | 100 | 100 | 100 | 100 | 100 | 100 |
| Melamine | | 1 | 3 | | | | | | | | | | | | |
| HMDA-C [1] | | | | 2.5 | 5 | | | | | | | | | | |
| TMDA-2HCl [2] | | | | | | 2 | 4 | | | | | | | | |
| EDA [3] | | | | | | | | 1 | 2 | | | | | | |
| Hydrazine-2HCl | | | | | | | | | | 1.5 | 3 | | | | |
| PDA [4] | | | | | | | | | | | | 1.5 | 3 | | |
| Piperazine | | | | | | | | | | | | | | 5 | |
| PMVP [5] | | | | | | | | | | | | | | | 10 |
| MgO [6] | | | | | | 1.5 | 3 | | | 1.5 | 3 | | | | |
| Percent Gel Formation | 0 | 27 | 59 | 100 | 105 | 68 | 61 | 90 | 99 | 66 | 42 | 101 | 105 | 102 | 82 |
| Percent Swell (toluene) | ∞ | 335 | 416 | 284 | 161 | 418 | 398 | 391 | 316 | 424 | 384 | 228 | 152 | 270 | 1,005 |

[1] Hexamethylenediamine carbamate.
[2] Tetramethylenediamine dihydrochloride.
[3] Ethylenediamine.
[4] p-Phenylenediamine.
[5] Poly(2-methyl-5-vinylpyridine).
[6] Magnesium oxide.

EXAMPLES 15–23

These examples demonstrate the cross-linking with hexamethylenediamine carbamate of epichlorohydrin polymers of varying RSV's compounded with carbon black and/or neutral silica and the physical properties of the vulcanizates so obtained. The amounts of the ingredients used in each example are tabulated in Table II along with the physical properties of each. The cross-linking was carried out in each case for 40 minutes at 300° F. except for Example 23 which was heated for 20 minutes at 300° F.

The poly(epichlorohydrin) used in Examples 15–18 and 22 had an RSV of 0.75 and was prepared essentially as described in Examples 1–14 above. The poly(epichlorohydrin) used in Example 19 had an RSV of 3.4 again by essentially the same procedure except that in this case the triisobutylaluminum was not prereacted with water. The polymers used in Examples 20 and 21 were prepared by the same procedure described in Examples 1–14 except that the diluent was n-heptane and the polymerization was carried out at 30° and 65° C., respectively. The polymer of Example 23 was again prepared by the procedure used for Examples 1-14 except that the catalyst was triethylaluminum that had been prereacted with 0.6 mole of water per mole of aluminum. This polymer was essentially all amorphous polymer.

TABLE II

| Example | 15 | 16 | 17 | 18 | 19 | 20 | 21 | 22 | 23 |
|---|---|---|---|---|---|---|---|---|---|
| RSV | 0.75 | 0.75 | 0.75 | 0.75 | 3.4 | 0.57 | 0.27 | 0.75 | 2.8 |
| Composition: | | | | | | | | | |
| Polymer | 100 | 100 | 100 | 100 | 100 | 100 | 100 | 100 | 100 |
| Carbon Black O | 25 | | 12.5 | | 50 | | | | |
| Carbon Black A | | 25 | 12.5 | 12.5 | | 12.5 | 12.5 | | 50 |
| Neutral Silica | | | | 12.5 | | 12.5 | 12.5 | | |
| HMDA-C | 3 | 3 | 3 | 3 | 5 | 3 | 3 | 4 | 1.25 |
| Tensile Strength, p.s.i | 1,180 | 565 | 1,075 | 1,655 | 1,390 | 400 | 450 | 90 | 2,000 |
| 100% Modulus, p.s.i | 505 | 280 | 400 | 395 | 1,200 | 215 | 155 | 65 | 560 |
| 200% Modulus, p.s.i | | | | 555 | | | 250 | | 1,350 |
| 300% Modulus, p.s.i | | | | 930 | | | | | 1,900 |
| 400% Modulus, p.s.i | | | | 1,510 | | | | | |
| Ultimate Elongation, percent | 315 | 240 | 295 | 420 | 110 | 190 | 245 | 150 | 71 |
| Shore Hardness A2 | | | | 63 | 60 | 38 | 31 | 25 | |

The high modulus poly(epichlorohydrin) vulcanizate of Example 19, the low modulus poly(epichlorohydrin) vulcanizate of Example 18, and the gum vulcanizate of poly(epichlorohydrin) of Example 22 were tested for solubility in a number of solvents. The volume percent swell is tabulated below.

*Volume Percent Swell*

| Solvent | High-Modulus PECH | Low-Modulus PECH | Gum Vulc. PECH |
|---|---|---|---|
| Water | 25 | 5 | 50 |
| Glacial Acetic | 45 | 75 | 175 |
| Methanol | 50 | 15 | 125 |
| Ethylene Glycol | <5 | 10 | 125 |
| Acetone | 190 | 210 | 435 |
| Isopropyl Ether | 10 | 30 | 35 |
| Toluene | 160 | 250 | 380 |
| Isooctane | <5 | <5 | 25 |
| Cyclohexane | 5 | 15 | 25 |
| Turpentine | <5 | 15 | 25 |
| CCl₄ | 40 | 65 | 80 |
| CS₂ | 35 | 40 | 60 |

The vulcanizate of Example 18 was tested for its stability to light and weather. It was unchanged after three months' outdoor exposure and in accelerated aging tests was still unchanged after 2500 hours in both the Fade-Ometer and the Weather-Ometer.

EXAMPLE 24

Epibromohydrin was polymerized by the same general procedure described above for epichlorohydrin using as catalyst triisobutylaluminum that had been prereacted with 0.5 mole of water per mole of aluminum compound. The ether-insoluble polymer that had formed after 19 hours at 30° C. was separated and then extracted with acetone at room temperature. The acetone-soluble polymer was recovered by removing the acetone and treating the residue with methanol containing 0.2% Santonox and finally drying at 80° C. under vacuum. The poly(epibromohydrin) so obtained was a tough, rubbery material having an RSV of 0.8 and a bromine analysis in agreement with the theoretical value. It was shown to be amorphous by X-ray.

This poly(epibromohydrin) was cross-linked by milling together 100 parts of the polymer, 12.5 parts carbon black, 12.5 parts silica and 4 parts of hexamethylenediamine carbamate and then heating the mixture for 40 minutes at 300° F. The vulcanizate so obtained was insoluble in cyclohexanone after 4 hours at 60° C. and had properties typical of a cross-linked elastomer.

EXAMPLE 25

A polymerization vessel with a nitrogen atmosphere was charged with 35 parts of n-heptane, 2 parts of epichlorohydrin and 8 parts of propylene oxide. After equilibrating at 30° C., a catalyst solution consisting of 0.79 part of triisobutylaluminum in n-heptane which had been reacted with 0.5 mole of acetylacetone per mole of aluminum and then with 0.5 mole of water per mole of aluminum, was added. After 6 hours at 30° C. the polymerization was stopped by adding 4 parts of anhydrous ethanol and the reaction mixture was diluted with an equal volume of diethyl ether. The reaction mixture was then washed with a 3% aqueous hydrogen chloride solution, with water until neutral, with a 2% aqueous sodium bicarbonate solution and again with water. After adding Santonox equal to 0.5% based on the polymer, the ether-n-heptane diluent was removed and the polymer was dried. The epichlorohydrin-propylene oxide copolymer so obtained was a tacky, snappy rubber that had an RSV of 5.7 (0.1% solution in benzene at 25° C.) and was soluble in benzene and n-heptane. A chlorine analysis showed that it contained 12% of the epichlorohydrin monomer.

This epichlorohydrin-propylene oxide copolymer was cross-linked by milling together 100 parts of the copolymer with 2 parts of ethylenediamine and then heating at 300° F. for 40 minutes. The vulcanizate so obtained had a percent gel formation of 82 and percent swell of 1425 in comparison to 0 and ∞, respectively, for the control where no amine was added.

What I claim and desire to protect by Letters Patent is:

1. A cross-linked polymer of an epihalohydrin which has been prepared by heating a polymer of an epihalohydrin at a temperature of from about 250° F. to about 340° F. for a period of from about 60 minutes to about 5 minutes with from about 0.5% to about 10% of one of the group consisting of polyamines, hydrogen halide salts of polyamines, and polyamine carbamates, said polymer of an epihalohydrin being predominately amorphous, having a crystalline polymer content of less than about 30%, having a reduced specific viscosity of at least 0.2 as measured at 100° C. on a 0.1% solution in α-choronaphthalene, and selected from the group consisting of poly(epihalohydrin)s and copolymers of an epihalohydrin with at least one other vicinal monoepoxide, the repeating epihalohydrin units in said polymer being of the formula

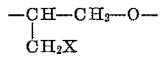

where X is halogen and being joined to any other copolymerized vicinal monoepoxide through the oxygen of the epoxide ring of said vicinal monoepoxide.

2. The product of claim 1 wherein the epihalohydrin polymer is poly(epihalohydrin).

3. The product of claim 1 wherein the epihalohydrin polymer is a copolymer of an epihalohydrin and at least one other vicinal monoepoxide.

4. The product of claim 2 wherein the poly(epihalohydrin) is poly(epichlorohydrin).

5. The product of claim 2 wherein the poly(epihalohydrin) is poly(epibromohydrin).

6. The product of claim 3 wherein the copolymer is a copolymer of epichlorohydrin and propylene oxide.

7. A cross-linked polymer of epichlorohydrin which has been prepared by heating, at a temperature of from about 250° F. to about 340° F. for a period of about 60 minutes to about 5 minutes, an essentially amorphous poly(epichlorohydrin) having a reduced specific viscosity of at least 0.5 as measured at 100° C. on a 0.1% solution in α-chloronaphthalene, the repeating epichlorohydrin units in said polymer being of the formula

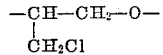

with from about 0.5% to about 10% of an amine containing at least two primary amino groups.

8. A cross-linked polymer of epichlorohydrin which has been prepared by heating, at a temperature of from about 250° F. to about 340° F. for a period of about 60 minutes to about 5 minutes, an essentially amorphous poly(epichlorohydrin) having a reduced specific viscosity of at least 0.5 as measured at 100° C. on a 0.1% solution in α-chloronaphthalene, the repeating epichlorohydrin units in said polymer being of the formula −CH−CH$_2$−O−
  |
  CH$_2$Cl with from about 0.5% to about 10% of a carbamate of an amine containing at least two primary amino groups.

9. A cross-linked polymer of epichlorohydrin which has been prepared by heating, at a temperature of from about 250° F. to about 340° F. for a period of about 60 minutes to about 5 minutes, an essentially amorphous copolymer of epichlorohydrin and propylene oxide having a reduced specific viscosity of at least 0.5 as measured at 100° C. on a 0.1% solution in α-chloronaphthalene, the repeating epichlorohydrin units in said polymer being of the formula

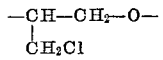

and being joined to the copolymerized propylene oxide units through the oxygen of the epoxide ring of said propylene oxide, with from about 0.5% to about 10% of an amine having at least two primary amino groups.

10. A cross-linked polymer of epichlorohydrin which has been prepared by heating, at a temperature of from about 250° F. to about 340° F. for a period of about 60 minutes to about 5 minutes, an essentially amorphous poly(epichlorohydrin) having a reduced specific viscosity of at least 0.5 as measured at 100° C. on a 0.1% solution in α-chloronaphthalene, the repeating epichlorohydrin units in said polymer being of the formula

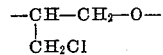

with from about 0.5% to about 10% of ethylenediamine.

11. A cross-linked polymer of epichlorohydrin which has been prepared by heating at a temperature of from about 250° F. to about 340° F. for a period of about 60 minutes to about 5 minutes, an essentially amorphous poly (epichlorohydrin) having a reduced specific viscosity of at least 0.5 as measured at 100° C. on a 0.1% solution in α-chloronaphthalene, the repeating epichlorohydrin units in said polymer being of the formula

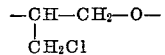

with from about 0.5% to about 10% of hexamethylenediamine carbamate.

12. A cross-linked polymer of epichlorohydrin which has been prepared by heating, at a temperature of from about 250° F. to about 340° F. for a period of from about 60 minutes to about 5 minutes, an essentially amorphous copolymer of epichlorohydrin and propylene oxide, having a reduced specific viscosity of at least 0.5 as measured at 100° C. on a 0.1% solution in α-chloro-naphthalene, the repeating epichlorohydrin units in said polymer being of the formula

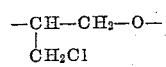

and being joined to the copolymerized propylene oxide units through the oxygen of the epoxide ring of said propylene oxide, with from about 0.5% to about 10% of ethylenediamine.

13. The process of cross-linking a substantially amorphous polymer of epihalohydrin which comprises heating said polymer, at a temperature of from about 250° F. to about 340° F. for a period of about 60 minutes to about 5 minutes, with from about 0.5% to about 10% of one of the group consisting of polyamines, hydrogen halide salts of polyamines, and polyamine carbamates, said polymer of an epihalohydrin having a reduced specific viscosity of at least about 0.5 as measured at 100° C. on a 0.1% solution in α-chloronaphthalene and which is selected from the group consisting of poly(epihalohydrin)s and copolymers of an epihalohydrin with at least one other vicinal monoepoxide, the repeating epihalohydrin units in said polymer being of the formula

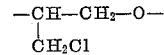

where X is halogen and being joined to any other copolymerized vicinal monoepoxide through the oxygen of the epoxide ring of said vicinal monoepoxide.

14. The process of claim 13 wherein the polymer is an essentially amorphous poly(epichlorohydrin).

15. The process of claim 13 wherein the polymer is an essentially amorphous poly(epibromohydrin).

16. The process of claim 13 wherein the polymer is an essentially amorphous copolymer of epihalohydrin and propylene oxide.

17. The process of cross-linking an essentially amorphous poly(epichlorohydrin) having a reduced specific viscosity of at least about 0.5 as measured at 100° C. on a 0.1% solution in α-chloronaphthalene, the repeating epichlorohydrin units in said polymer being of the formula

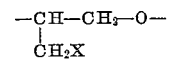

which comprises heating said polymer, at a temperature of from about 250° F. to about 340° F. for a period of from about 60 minutes to about 5 minutes, with from about 0.5% to about 10% of an amine containing at least two primary amino groups.

18. The process of cross-linking an essentially amorphous copolymer of epichlorohydrin and propylene oxide having a reduced specific viscosity of at least about 0.5 as measured at 100° C. on a 0.1% solution in α-chloronaphthalene, the repeating epichlorohydrin units in said polymer being of the formula

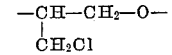

and being joined to the copolymerized propylene oxide units through the oxygen of the epoxide ring of said propylene oxide, which comprises heating said copolymer, at a temperature of from about 250° F. to about 340° F. for a period of from about 60 minutes to about 5 minutes, with from about 0.5% to about 10% of an amine containing at least two primary amino groups.

19. The process of claim 17 wherein the amine is hexamethylenediamine carbamate.

20. The process of claim 17 wherein the amine is ethylenediamine.

References Cited in the file of this patent
UNITED STATES PATENTS 2,451,174    Reuter _____ Oct. 12, 1948

(Other references on following page)

UNITED STATES PATENTS

| | | |
|---|---|---|
| 2,699,435 | Auten et al. | Jan. 11, 1955 |
| 2,706,189 | Pruitt et al. | Apr. 12, 1955 |
| 2,712,000 | Zech | June 28, 1955 |
| 2,714,276 | Landes | Aug. 2, 1955 |
| 2,694,655 | Pullman et al. | Nov. 16, 1956 |
| 2,840,533 | Hwa | June 24, 1958 |
| 2,862,894 | Hwa | Dec. 2, 1958 |
| 2,871,219 | Baggett et al. | Jan. 27, 1959 |

OTHER REFERENCES

Narracott: "British Plastics," vol. 24, October 1951, pp. 341–345.